United States Patent [19]

Yano et al.

[11] Patent Number: 5,102,953

[45] Date of Patent: Apr. 7, 1992

[54] NON-TACKY COMPOSITE RESIN COMPOSITION AND PROCESS FOR THE PREPARATION THEREOF

[75] Inventors: Noriyoshi Yano, Zushi; Tetsuo Kijima; Shohei Tsunoda, both of Tokyo; Toshihiko Tanaka, Yokkaichi, all of Japan

[73] Assignees: Nippon Polurethane Industry Co., Ltd., Yamaguchi; Tosoh Corporation, Tokyo, both of Japan

[21] Appl. No.: 713,553

[22] Filed: Jun. 7, 1991

Related U.S. Application Data

[63] Continuation of Ser. No. 558,055, Jul. 24, 1990, abandoned.

[30] Foreign Application Priority Data

Jul. 27, 1989 [JP] Japan .................. 1-192568
Mar. 16, 1990 [JP] Japan .................. 2-064020

[51] Int. Cl.$^5$ .............................................. C08F 8/00
[52] U.S. Cl. .................................. 525/101; 525/104
[58] Field of Search ........................... 525/104, 101

[56] References Cited

U.S. PATENT DOCUMENTS

| | | | |
|---|---|---|---|
| 4,206,299 | 6/1980 | Yamazaki et al. | 528/288 |
| 4,381,361 | 4/1983 | Hardt et al. | 524/265 |
| 4,503,189 | 3/1985 | Igarashi et al. | 525/104 |
| 4,839,443 | 6/1989 | Akutsu et al. | 525/474 |

FOREIGN PATENT DOCUMENTS 264072 4/1988 European Pat. Off.

*Primary Examiner*—John C. Bleutge
*Assistant Examiner*—M. Glass
*Attorney, Agent, or Firm*—Davis Hoxie Faithfull & Hapgood

[57] ABSTRACT

A non-tacky composite resin composition comprises a polyurethane having a group represented by the general formula (I) in the molecule thereof, and a polyvinyl chloride,

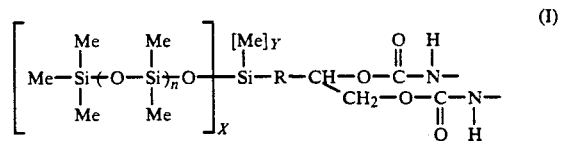

where Me is a methyl group, n is an integer of $1 \leq n \leq 100$, X and Y are respectively an integer provided that $1 \leq X \leq 3$, $0 \leq Y \leq 2$, and $X + Y = 3$, and R is an alkylene group or alkylene groups which may be linked by one or more alkyleneoxy groups.

48 Claims, No Drawings

NON-TACKY COMPOSITE RESIN COMPOSITION AND PROCESS FOR THE PREPARATION THEREOF

This is a continuation of copending application Ser. No. 07/558,055 filed on July 24, 1990 now abandoned.

BACKGROUND OF THE INVENTION

1. Field of the Invention

The present invention relates to a non-tacky composite resin composition of a polyurethane-polyvinyl chloride series, and a process for the preparation of the composition.

2. Related Background Art

Polyvinyl chloride type resins (hereinafter the term "polyvinyl chloride" is referred to as "PVC") in combination with a low-molecular weight plasticizer such a dioctyl phthalate are used as general-purpose non-rigid PVC resins in variety of application fields. The non-rigid PVC resins, however, have defects of low oil resistance, low heat-resistance, low adhesiveness, etc. caused by extraction, migration, etc. of the low-molecular-weight plasticizer.

To improve the defects, polymer alloys by blending or copolymerization of a polyurethane resin (hereinafter the term "polyurethane" is referred to as "PU") and PVC have been known to give a sufficiently non-rigid PVC-PU type composite resin without using a low-molecular-weight plasticizer which is liable to be extracted or migrate.

However, in producing such a non-rigid PVC-PU type composite resin, a large quantity of soft PU is required. The PVC-PU type composite resin prepared by using a large quantity of PU resin has defects such as strong surface tackiness, etc. For example, the problems are encountered that lumping occurs on storage, and that mold-releasing property is poor on thermoforming such as injection molding, which lowers processability. The surface tackiness frequent)y hinders practical use of the products. In particular, powder sinter molding of a conventional PVC-PU type composite resin does not give products having satisfactory mechanical and surface properties because the PU component is not readily fusible under non-shearing conditions. From these reasons, application fields of the PVC-PU type composite resins are frequently limited in spite of their superior properties. In some application fields, a lubricant such as a higher fatty acid, silicone oil, etc., a dusting powder such as talc, etc. or a filler such as calcium carbonate, etc. is added to improve processability and surface tackiness of the products. However, &he use of the lubricant cause inconveniences of decrease of adhesiveness, or staining of the mold owing to migration of lubricant to the surface upon molding, and the use of a dusting powder or a filler may lower the transparency of the product or may deteriorate stain resistance.

For the purpose of avoiding such inconveniences, a group represented by any of the general formulas (1) to (3):

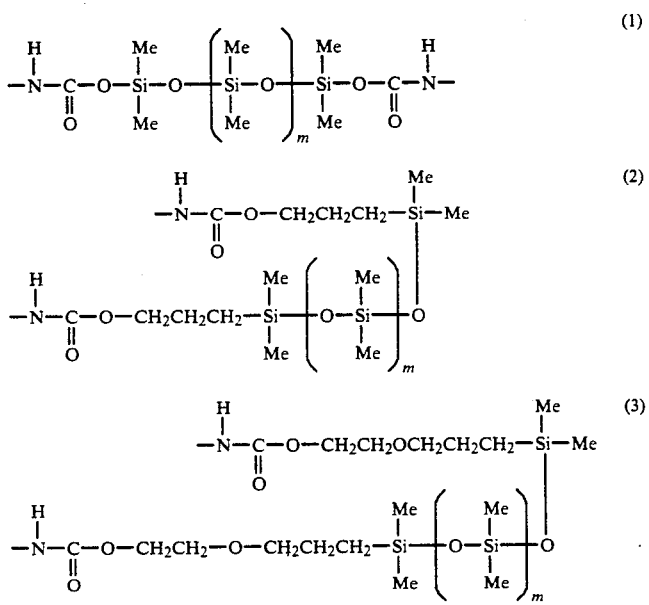

(where Me is methyl, and m is an integer of $1 \leq m \leq 450$), is introduced into the polyurethane molecule to prevent the migration of the lubricant to the surface and to improve slipping properties and mold releasing properties of the PU.

However, the PVC-PU type composite resins produced by using a polyurethane having the group represented by the above general formula (I), (2), or (3) are not sufficiently improved in the lumping-prevention effect and mold-releasing property as desired, and yet are impaired considerably in adhesiveness, although the adhesiveness is an important characteristic of the PVC-PU type composite resins.

SUMMARY OF THE INVENTION

An object of the present invention is to provide a non-tacky composite resin composition of a non-rigid PVC-PU type which is improved in surface tackiness, mold staining and mold releasing property in a molding process, and lumping in storage without impairing the superior characteristics of heat resistance, oil resistance, and adhesive properties of the resin.

Another object of the present invention is to provide a process for producing the non-tacky composite resin composition of the non-rigid PVC-PC type mentioned above.

Still another object of the present invention is to provide a non-tacky composite resin composition which is satisfactory in impact strength at low temperature, fogging resistance (namely, prevention of oil film formation on a glass surface) as well as the aforementioned properties, and is applicable to powder sinter molding.

A still further object of the present invention is to provide a process for producing the non-tacky composite resin composition of the non-rigid PVC-PU type mentioned above.

According to an aspect of the present invention, there is provided a non-tacky composite resin composition, comprising a polyurethane having a group represented by the general formula (I) in the molecule thereof, and a polyvinyl chloride,

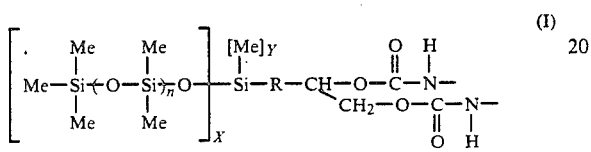 (I)

where Me is a methyl group, n is an integer of $1 \leq n \leq 100$, X and Y are respectively an integer provided that $1 \leq X \leq 3$, $0 \leq Y \leq 2$, and $X+Y=3$, and R is an alkylene group or alkylene groups which may be linked by one or more alkyleneoxy groups.

According to another aspect of the present invention, there is provided a non-tacky composite resin composition containing a polyurethane and a polyvinyl chloride, the polyurethane being produced by reacting (A) a diisocyanate compound,
(B) a polyester-polyol derived by reacting a dicarboxylic acid with a diol containing 3-methyl-1,5-pentanediol and/or 2-methyl-1,8-octanediol respectively or totally at a content of at least 30 mol % and other short-chain diols at a content of less than 70 mol %, and
(C) a one-diol-terminated polysiloxane represented by the general formula (II):

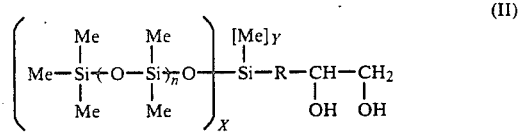 (II)

where Me is a methyl group, n is an integer of $1 \leq n \leq 100$, X and Y are respectively an integer provided that $1 \leq X \leq 3$, $0 \leq Y \leq 2$, and $X+Y=3$, and R is an alkylene group or alkylene groups which may be linked by one or more alkyleneoxy groups.

According to still another aspect of the present invention, there is provided a process for producing a non-tacky composite resin composition comprising a polyurethane having a group represented by the general formula (I) in the molecule thereof, and a polyvinyl chloride; the process comprising reacting a one-diol-terminated polysiloxane represented the general formula (II), a polyol, an isocyanate compound, and a polyvinyl chloride.

According to further aspect of the present invention, there is provided a process for producing a non-tacky composite resin composition comprising a polyurethane having a group represented by the general formula (I) in the molecule thereof, and a polyvinyl chloride; the process comprising reacting a one-diol-terminated polysiloxane represented the general formula (II), a polyol, and an isocyanate compound to prepare a polyurethane having a group represented by the general formula (I) in the molecule thereof: and subsequently blending the prepared polyurethane with a polyvinyl chloride.

DETAILED DESCRIPTION OF THE PREFERRED EMBODIMENT

The PU used in the present invention is prepared by reacting an isocyanate with a modified polysiloxane having two OH groups at one end (hereinafter referred to as "one-diol-terminated polysiloxane") represented by the general formula (II):

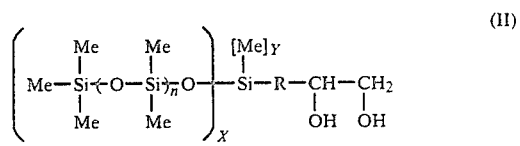 (II)

(where Me, n, X, y, and R are as defined above), and a polyol.

In the PU having the group represented by the general formula (I) described above, the R is preferably an alkylene group having 1 to 5 carbons which may be linked by one or two ethyleneoxy groups or propyleneoxy groups. The examples of "R" are:

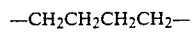

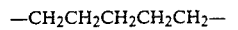

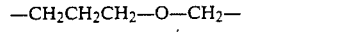

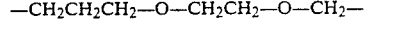

The one-diol-terminated polysiloxane used in the present invention is derived by addition reaction of a compound exemplified below:

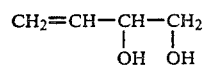

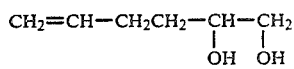

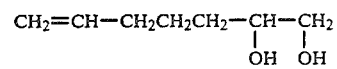

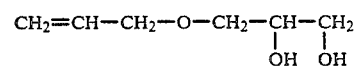

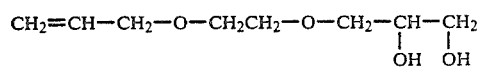

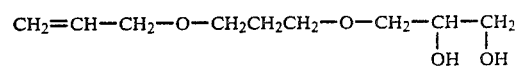

-continued with a polysiloxane having an $-\overset{|}{\underset{|}{Si}}H$ group derived by stopping the polymerization reaction with trichlorosilane, methyldichlorosilane, dimethylchlorosilane, or the like.

The one-diol-terminated polysiloxane has preferably a number-average molecular weight within the range of from 340 to 10,000, more preferably from 500 to 5,000. The one-diol-terminated polysiloxane having a number-average molecular weight of 5.000 or higher need to be added in a larger amount to suppress the tackiness of the surface of the PVC-PU type composite resin, and is liable to impair adhesive properties. The one-diol-terminated polysiloxane having a number-average molecular weight of 10,000 or more exhibits this tendency further more remarkably.

For the purpose of improvement in surface tackiness and adhesive properties, the one-diol-terminated polysiloxane is preferably used in an amount not more than 5%, more preferably in the range of from 0.1% to 3% based on the PU component in the non-tacky PVC-PU type composite resin composition.

The polyol employed in the present invention include long-chain polyols and short-chain polyols which are conventionally used in the preparation of PUs.

The long-chain polyols used for formation of PUs include polyester type polyols, polyetherpolyols, polyols, polycarbonate-polyols, vinyl-type polyols, diene-type polyols, castor oil-type polyols. polyolefin-type polyols, and copolymers thereof. These long-chain polyols have preferably a number-average molecular weight within the range of from 300 to 10,000, more preferably from 500 to 8,000, still more preferably from 1,500 to 8,000, from the standpoint of compatibility of the PU derived from the abovementioned polyol and PU.

The short-chain polyols used for the preparation of PUs include aliphatic, alicyclic, aromatic, substituted aliphatic, and heterocyclic dihydroxy compounds, trihydroxy compounds and tetrahydroxy compounds.

In particular, long-chain polyols for the preparation of PUs for the composite resin compositions suitable for powder sinter molding are preferably polyester-polyols derived by reacting a dicarboxylic acid with a diol containing 3-methyl-1,5-pentanediol and/or 2-methyl-1,8-octanediol respectively or totally at a content of at least 30 mol % and other short-chain diols at a content of less than 70 mol %. The dicarboxylic acid is exemplified by adipic acid, pimelic acid, suberic acid, azelaic acid, and sebacic acid. The short-chain diols include aliphatic, alicyclic, and substituted aliphatic diols such as ethylene glycol, 1,2-propanediol, 1,3-propanediol, 1,3-butanediol, 4-butanediol, 1,5-pentanediol, 1,6-hexanediol, neopentyl glycol, 1,9-nonanediol, 1,4-cyclohexane dimethanol, and the like.

The isocyanate compounds used in the present invention include aromatic, aliphatic, and alicyclic diisocyanates used conventionally for manufacture of PUs. Preferable therefor are diphenylmethane diisocyanate, tolylene diisocyanate, hexamethylene diisocyanate, 4,4'-dicyclohexylmethane diisocyanate, isophorone diisocyanate, and the like.

The amount of the isocyanate compound used in the PU component according to the present invention is preferably in the range of from 0.5 to 3, more preferably from 0.7 to 1.5, still more preferably from 0.7 to 1.1 in terms of NCO/OH molar ratio based on the total OH groups of the long-chain and short-chain polyols and the one-diol-terminated polysiloxane.

The PVC used in the present invention are polymers containing vinyl chloride units having a polymerization degree of not lower than 600, preferably in the range of from 700 to 1,300, including polyvinyl chloride homopolymers or copolymers composed mainly of vinyl chloride such as vinyl chloride/vinyl acetate copolymers, vinyl chloride/ethylene/vinyl acetate copolymers, and the like. The PVC may be blended preliminarily with an additive such as a stabilizer, a lubricant, a colorant, and the like.

Further, in the present invention, polymer-blended polyvinyl chloride may be used which has been preliminarily prepared by blending with a thermoplastic resin or rubber other than PU and compatible with PVC such as an acrylic resin, a styrene resin, an ABS resin, a nitrile rubber, and the like.

In the present invention, from the viewpoint of improving surface tackiness, adhesiveness, and fusibility in sinter molding of the composite resin compositions, the weight ratio of the PVC component and the PU component is preferably in the range of from 100/1000 to 100/10, more preferably from 100/200 to 100/20, still more preferably 100/150 to 100/50.

In the present invention, a plasticizer may be combinedly used in order to further improve the surface tackiness, adhesive properties, and fusibility of the composited resin compositions. The amount used thereof is preferably not more than 20 parts by weight based on 100 parts by weight of the composite resin from the stand point of securing long-term durability, and fogging resistance.

The plasticizers which may be used in the present invention include those conventionally used for PVC such as phthalic esters, trimellitic esters, dibasic acid esters, adipic polyesters, epoxy compounds, inorganic acid esters, and glycol esters. Specific examples are dioctyl phthalate, trioctyl trimellitate, 2-ethylhexyl adipate, 2-ethylhexyl azelate, epoxidated soybean oil, epoxidated linseed oil, tricresyl phosphate, tributoxyethyl phosphate, dibutyldiglycol adipate, and the like.

The composite resin composition according to the present invention may contain dusting powder. The preferable dusting powder includes PVC of from 1 to 10 μm diameter. And PVC having a polymerization degree of not less than 1,700, or having a crosslinked structure may be used.

The composite resin compositions having a particle diameter in the range of from 50 to 500 μm are especially preferable for powder sinter molding.

The process for the preparation of the non-tacky composite resin composition of the present invention includes:

a method of reacting a one-diol-terminated polysiloxane represented by the general formula (II) shown above, a polyol, an isocyanate compound, and a PVC;

a method of reacting a one-diol-terminated polysiloxane represented by the general formula (II) shown above, a polyol, and an isocyanate compound to form a PU having the group represented by the general formula (I) shown above in the molecule, and subsequently blending the resulting PU with a PVC; and a method of firstly reacting an isocyanate compound with a one-diol-terminated polysiloxane represented by the general formula (II) shown above, and subsequently reacting with a polyol to form a PU having the group represented by the general formula (I) shown above in the molecule, and further blending the resulting PU with a PVC.

More specifically, the non-tacky composite resin composition of a PVC-PU type according to the present invention is produced, for example, by the processes below.

(1) Blending of a PVC with a PU having a group represented by the general formula (1) shown above in the molecule: This process includes, in addition to a mechanical blending of a PVC with a PU, a method of blending solutions of the materials in organic solvents, and a method of blending an emulsions of the PVC and/or the PU; and (2) Reaction of a one-diol-terminated polysiloxane represented by the general formula (II) shown above, a polyol, and an isocyanate compound: This process includes reactions of these compounds in one batch, as well as successive reactions in arbitrary combinations and sequence.

The present invention provides a non-tacky composite resin composition of a PVC-PU series which has combinedly characteristics of the PU of toughness, wear resistance, solvent resistance, etc. and characteristics of PVC of weatherability, moldability, etc. and is superior in heat resistance and adhesive property, and is improved significantly in surface tackiness. The present invention also provides a simplified and economical process for the preparation of the non-tacky composite resin composition.

The non-tacky composite resin composition of the present invention is applicable in a variety of application fields such as films, sheets, leathers, tubes, hoses, wrapping films, wire coatings, coating materials, paints, and so on. In particular, sheets and films made of a conventional non-rigid PVC-PU type composite resin have tackiness which causes inconvenience in workability after winding-up, so that the superior properties thereof have not been practically utilized in practical use. The present invention has improved this disadvantage significantly. Further, the composite resin has satisfactory mold-releasability in molding of various articles, which improves remarkably the production efficiency. On the other hand, retention of the adhesive property of the non-tacky composite resin composition according to the present invention is important in the case where the composition is used as a surface material for a rigid plastic core.

The non-tacky composite resin composition of the present invention prepared by using a specified polyester-polyol, in addition to the abovementioned characteristics, has fogging resistance as well as low-temperature impact strength and superior molding characteristics (such as sufficient fusibility and less mold-staining) in powder sinter molding, which properties are incompatible, and the solution of this problem has been difficult. Accordingly, this composition can be molded efficiently by means of powder sinter molding into a large molded article in complicated shape such as molded internal parts of vehicles and large high-performance instrument panels.

Thus, the present invention is of great significance because of especially broad range of application fields of the products.

The present invention is described more specifically referring to examples. In the Examples, the term "parts" means "parts by weight".

REFERENCE EXAMPLE 1

2,360 g (20 mols) of 1,6-hexanediol, 2,360 g (20 mols) of 3-methyl-1,5-pentanediol, 1,060 g (10 mols) of neopentylglycol, and 6,512 g (44.6 mols) of adipic acid were placed in a 15-liter reactor provided with a condenser. Thereto, 0.2 g of tetrabutyl titanate was added and dehydration reaction was allowed to proceed at 200° C. at a atmospheric pressure for 12 hours, and further at 200° C. for 12 hours under reduced pressure. Thereby, 10,680 g of a polyesterpolyol (hereinafter referred to as "PE-1") was obtained which has an acid value of 0.2, a hydroxyl value of 55.9, and a number-average molecular weight of 2,000.

REFERENCE EXAMPLES 2 To 6

Polyester-polyols were prepared in the same manner as in Reference example 1 except that the diols and the dicarboxylic acid were changed.

Table 1 shows the starting materials and the molar ratios (mol %) thereof, and the number-average molecular weight of the resulting polyester-polyol.

TABLE 1

| Starting material (molar ratio) | Reference example No. | | | | | |
|---|---|---|---|---|---|---|
| | 1 | 2 | 3 | 4 | 5 | 6 |
| Diols | | | | | | |
| 3-methyl-1,5-pentanediol | 40 | 54 | 70 | 100 | | 25 |
| 2-methy-1,8-octanediol | | | | | 50 | 25 |
| 1,4-butanediol | | | 30 | | | |
| Neopentyl glycol | 20 | 36 | | | 50 | |
| 1,6-hexanediol | 40 | 10 | | | | 50 |
| Dicarboxylic acid | | | | | | |
| Adipic acid | 89 | 96 | | 89 | 88 | 95 |
| Azelaic acid | | | 90 | | | |
| Number-average molecular weight of product | 2000 | 6450 | 2400 | 2000 | 2000 | 4600 |
| Abbreviation | PE-1 | PE-2 | PE-3 | PE-4 | PE-5 | PE-6 |

REFERENCE EXAMPLE 7

To 2 parts of a one-diol-terminated polysiloxane having a polymerization degree of 2,000 of the formula:

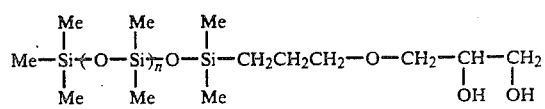

17 parts of hexamethylene diisocyanate was added with stirring, and the reaction was allowed to proceed at 75° C. for 4 hours. The resulting product is referred to as PS-1.

REFERENCE EXAMPLE 8

The reaction was carried out in the same manner as in Reference example 7 except that the one-diol-terminated polysiloxane used in Reference example 7 was replaced by the one having a polymerization degree of 2,000 of the formula:

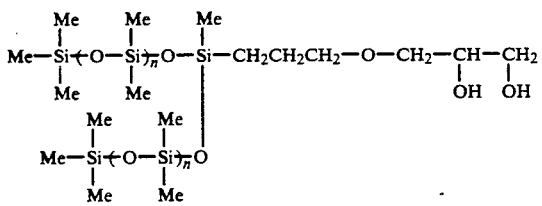

and the hexamethylene diisocyanate was replaced by tolylene diisocyanate. The resulting product is referred to as PS-2.

COMPARATIVE REFERENCE EXAMPLE

The reaction was carried out in the same manner as in Reference example 7 except that the one-diol-terminated polysiloxane used in Reference example 7 was replaced by the 2 parts of modified polysiloxane having an OH group respectively on both ends and having a polymerization degree of 5,000 of the formula:

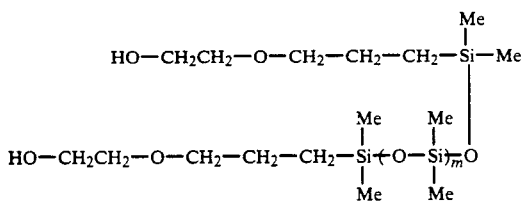

The resulting product is referred to as PS-3.

EXAMPLE 1

200 parts of polyester-diol having a polymerization degree of 2,000 prepared from a mixed diol consisting of 1,6-hexanediol and neopentylglyool (1/1) and adipic acid was added to PS-1and the mixture was stirred at a high speed. Subsequently, the mixture was spread on a vat in a drier kept at 120° C., the reaction was completed for one hour. 100 parts of the resulting PU was kneaded with 100 parts of a powdery PVC having a polymerization degree of 1,000, 0.5 part of calcium stearate, and 0.5 part of zinc stearate at 150° C. for 10 minutes. The blended matter was pressed into a sheet of 0.8 mm thick.

EXAMPLE 2

A sheet was prepared in the same manner as in Example 1 except that PS-2 was used in place of PS-1.

EXAMPLES 3 AND 4 1

A sheet was prepared in the same manner as in Example 1 except that the amounts of the one-diol-terminated polysiloxane and the hexamethylene diisocyanate to be added to PS-1were changed respectively as shown in Table 2.

TABLE 2

| | Example No. | |
|---|---|---|
| | 3 | 4 |
| One-diol-terminated polysiloxane (parts) | 1 | 10 |
| Hexamethylene diisocyanate (parts) | 16 | 18 |

EXAMPLE 5

16 parts of hexamethylene diisocyanate and 200 parts of the polyester-diol used in Example 1were added to 2 parts of the one-diol-terminated polysiloxane used in Reference example 7, and the mixture was stirred at a high speed. Subsequently, the mixture was spread on a vat in a drier kept at 120° C., and the reaction was completed for one hour.

There were mixed 40 parts of the resulting PU. 40 parts of PVC having a polymerization degree of 1,000, 0.4 parts of calcium stearate, 0.4 parts of inc stearate, and 20 parts of flakes in a size of approximately 1 Cm × 1 cm, which was given by cutting from the sheet prepared in Example 4. The resulting flakes were kneaded at 150° C. for 10 minutes to press into a sheet of 0.8 mm thick.

COMPARATIVE EXAMPLE 1

A mixture of 16 parts of hexamethylene diisocyanate and 200 parts of polyester-diol used in Example 1 was agitated at a high speed. The mixture was spread on a vat in a drier kept at 120° C., and the reaction was completed for one hour. Therefrom, a sheet was prepared in the same manner as in Example 1.

COMPARATIVE EXAMPLE 2

A sheet was prepared in the same manner as in Example 1except that PS-3 was used in place of PS-1.

METHOD OF MEASUREMENT OF PROPERTIES

The properties of the sheets obtained in Examples 1–5 and Comparative examples 1and 2 were measured as described below. The measured properties are shown in Table 3.

1. Surface tackiness (Lumping tendency)

The sheet was cut in a size of 5 cm × 5 cm. Two of the cut sheets were superposed, and pressed uniformly in a plane with a 500 g load for 24 hours in a thermostat kept at 25° C. The separability of the sheets was evaluated. The results are shown in two evaluation grade below:

○: Not adhered
×: Not easily separated

2. Mold releasability (1)

A nickel plate having a leather pattern engraved on the surface and the sample sheet were superposed and pressed at a pressure of 50 kg/cm² at 160° C. for 5 minutes. After water-cooling, the releasing force (g/cm) to separate the sheet from the nickel plate was measured.

3. Adhesive property (1)

The sample sheet and an ABS plate (made by Nippon Test Panel K.K.) were contact-bonded with a roll by using a two-part polyurethane type adhesive [Nippolan 3022 (100 parts) and Coronate L (5 parts); made by Nippon Polyurethane Industry Co., LTD.]. The bonded article was cured at 60° C. for 3 hours. After three days therefrom, adhesion strength (kg/cm) was measured.

4. Hardness

The hardness was measured according to JIS K6301.

5. Tensile properties (tensile strength, elongation)

The tensile properties were measured according to JIS K6723.

TABLE 3

|  | Example | | | | | Comparative example | |
|---|---|---|---|---|---|---|---|
|  | 1 | 2 | 3 | 4 | 5 | 1 | 2 |
| Surface tackiness | ◯ | ◯ | ◯ | ◯ | ◯ | X | X |
| Mold releasability (g/cm) | 30 | 28 | 87 | 10 | 32 | 530 | 320 |
| Adhesion strength (kg/cm) | 4.2 | 4.1 | 6.3 | 2.3 | 4.1 | 4.8 | 1.2 |
| Hardness (JIS A) | 67 | 65 | 68 | 66 | 68 | 65 | 67 |
| Tensile strength (kg/cm$^2$) | 170 | 160 | 165 | 170 | 165 | 175 | 165 |
| Elongation (%) | 520 | 530 | 510 | 500 | 490 | 510 | 520 |

EXAMPLE 6

(1) 100 parts of a powdery PVC having a polymerization degree of 1,000 was placed in a Henschel mixer. While the PVC was agitated for mixing at a rotation speed of 1,000 rpm in the Henschel mixer, a mixture was added thereto which had been prepared separately by adding 9.8 parts of PS-1 to 90 parts of PE-I preliminarily heated to 70° C. end agitating at a high speed for 1minute.

Further, thereto 4 parts of a Ba-Zn type PVC stabilizer was added, and agitation was conducted for one hour with keeping the inner temperature of the Henschel mixer at 80° C. Subsequently, the inner temperature was lowered below 40° C. 10 parts of a paste PVC resin (polymerization degree: 700) was added thereto, and agitated for 2 minutes to give a powdery product.

This powdery product was classified with a 32-mesh sieve. After eliminating the granular matter on the sieve, the yield of the powder was 98 %.

(2) The resulting powdery product was subjected to powder sinter molding with an embossing plate having a nickel surface with a copper back at 220° C. for one minute to give a sheet of average thickness of 0.8 mm.

EXAMPLE 7

100 parts of a powdery PVC having a polymerization degree of 1,000 was placed in a Henschel mixer. While the PVC was agitated for mixing at a rotation speed of 1,000 rpm in the Henschel mixer, a mixture was added thereto which had been prepared separately by adding 20 parts of trioctyl trimellitate, 1 part of 1,4-butanediol, and 5 parts of PS-1 to 70 parts of PE-2 preliminarily heated to 70° C. and agitating at a high speed for 1minute.

The succeeding procedure was effected in the same manner as in Example 6 to obtain a sheet of average thickness of 0.8 mm.

EXAMPLE 8

100 parts of a powdery PVC having a polymerization degree of 1,000 was placed in a Henschel mixer. While the PVC was agitated for mixing at a rotation speed of 1,000 rpm in the Henschel mixer, a mixture was added thereto which had been prepared separately by adding 20 parts of trioctyl trimellitate and 6.3 parts of PS-1 to 70 parts of PE-3 preliminarily heated to 70° C. and agitating at a high speed for 1minute.

The succeeding procedure was effected in the same manner as in Example 6 to obtain a sheet of average thickness of 0.8 mm.

EXAMPLE 9

A sheet of average thickness of 0.8 mm was prepared in the same manner as in Example 8 except that PE-4 was used in place of PE-3 and 7.7 parts of PS-2 was used in place of 6.3 parts of PS-1.

EXAMPLE 10

A sheet of average thickness of 0.8 mm was prepared in the same manner as in Example 8 except that PE-5 was used in place of PE-3 and the amount of PS-1was changed to 7.6 parts.

EXAMPLE 11

A sheet of average thickness of 0.8 mm was prepared in the same manner as in Example 8 except that PE-6 was used in place of PE-3 and the amount of PS-1was changed to 3.3 parts.

COMPARATIVE EXAMPLE 3

A sheet of average thickness of 0.8 mm was prepared in the same manner as in Example 8 except that 4.8 parts of hexamethylene diisocyanate was used in place of 6.3 parts of PS-1.

COMPARATIVE EXAMPLE 4

A sheet of average thickness of 0.8 mm was prepared in the same manner as in Example 8 except that PS-3 was used in place of PS-1.

COMPARATIVE EXAMPLE 5

100 parts of a powdery PVC having a polymerization degree of 1,000 was placed in a Henschel mixer. While the PVC was agitated for mixing at a rotation speed of 1,000 rpm in the Henschel mixer, 80 parts of trioctyl trimellitate and 4 parts of a Ba-Zn type PVC stabilizer was added thereto, and agitation was effected for one hour with keeping the inner temperature of the Henschel mixer at 100° C. Subsequently, the inner temperature was lowered below 40° C., 10 parts of a microsuspension paste PVC resin (polymerization degree: 700) was added thereto, and agitated for 2 minutes to give a powdery product.

The resulting powdery product was molded in the same manner as in Example 6 into a sheet of average thickness of 0.8 mm.

METHOD OF MEASUREMENT OF PROPERTIES

The results of measurement of the properties below are shown in Table 4.

1. Fusibility:

In Examples 6–11and Comparative examples 3–5, the molded article was cooled by water immediately after the powder sinter molding (220° C., one minute), and the state of fusion at the back side of the formed sheet (the opposite side to metal face) and the uniformity of thickness were visibly evaluated.

The results are shown in three evaluation grades below:

◯: fused evenly with uniform thickness
Δ: fused not completely
X: fused not completely with significant non-uniformity of thickness 2. Mold releasability (2)

In Examples 6-11 and Comparative examples 3-5, a pair of incisions were made in 2 cm breadth on the sheet which had been molded by powder sinter molding and water-cooled. The releasing force (g/cm) from the mold was measured at 180-degree turning-over.

The results are shown in two evaluation grades below:
◯: less than 50 g/cm
✕: not less than 50 g/cm 3. Mold staining property Powder sinter molding was repeated ten times with the same powder. The brightness of the 10th molded sheet was visibly evaluated at the surface in contact with the mold.

The evaluated results are shown in two evaluation grades.
◯: same as the first molded sheet
✕: brighter than the first molded sheet 4. Adhesive property (2)

An integrally molded flat plate was prepared by use of the sheet obtained in Examples 6-11 and Comparative example 3-5 and a polyurethane foam.

The adhesion force (adhesive property) was measured according to a 180-degree peeling test. The results of the measurement are shown in the two evaluation grades below:
◯: not less than 300 g/cm
✕: less than 300 g/cm 5. Durability The aforementioned integrally molded flat plate was kept in a Geer oven at 120° C. for 500 hours. Then the elongation of the sheet at break was measured according to JIS K6723, and the value was represented by the retention ratio (%) in comparison with the initial value.

TABLE 4

|  | Example | | | | | | Comparative example | | |
| --- | --- | --- | --- | --- | --- | --- | --- | --- | --- |
|  | 6 | 7 | 8 | 9 | 10 | 11 | 3 | 4 | 5 |
| Fusibility | ◯ | ◯ | ◯ | ◯ | ◯ | ◯ | ◯ | ◯ | ◯ |
| Mold-releasing property (2) | ◯ | ◯ | ◯ | ◯ | ◯ | ◯ | ✕ | ✕ | ◯ |
| Mold releasing force (g/cm) | 35 | 30 | 25 | 45 | 30 | 40 | 250 | 180 | 30 |
| Mold staining | ◯ | ◯ | ◯ | ◯ | ◯ | ◯ | ✕ | ◯ | ✕ |
| Adhesive property (2) | ◯ | ◯ | ◯ | ◯ | ◯ | ◯ | ◯ | ✕ | ✕ |
| Adhesion force (g/cm) | 550 | 420 | 380 | 400 | 390 | 430 | 450 | 200 | 180 |
| Elongation retention rate (%) | 85 | 80 | 80 | 82 | 81 | 83 | 81 | 79 | 30 |
| Tensile properties: | | | | | | | | | |
| (a) Elongation at break (%) | 260 | 310 | 280 | 310 | 270 | 290 | 300 | 320 | 280 |
| (b) Tensile strength at break (kg/cm²) | 110 | 95 | 90 | 90 | 90 | 90 | 95 | 90 | 85 |

What is claimed is:

1. A non-tacky composite resin composition, comprising a polyurethane having a group represented by the general formula (I) in the molecule thereof, and a polyvinyl chloride,

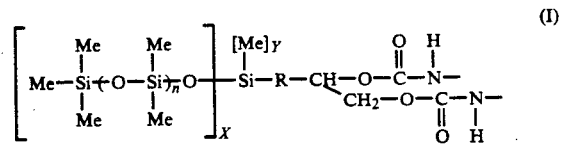

where Me is a methyl group, n is an integer of 1≦n≦100, X and y are respectively an integer provided that 1≦X≦3, 0≦y≦2, and X+y=3, and R is an alkylene group or alkylene groups which may be linked by one or more alkyleneoxy groups.

2. The non-tacky composite resin composition of claim 1, wherein R is an alkylene group having 1-5 carbons which may be linked by one or two ethyleneoxy groups or propyleneoxy groups.

3. A non-tacky composite resin composition containing a polyurethane and a polyvinyl chloride, said polyurethane being produced by reacting
(A) a diisocyanate compound,
(B) a polyol, and
(C) a one-diol-terminated polysiloxane represented by the general formula (II):

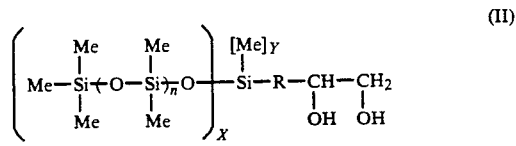

where Me is a methyl group, n is an integer of 1≦n≦100, X and Y are respectively integers, provided that 1≦X≦3, 0≦Y≦2, and X+Y=3, and R is an alkylene group or alkylene groups which may be linked by one or more alkyleneoxy groups.

4. A process for producing a non-tacky composite resin composition comprising a polyurethane having a group represented by the general formula (I) in the molecule thereof:

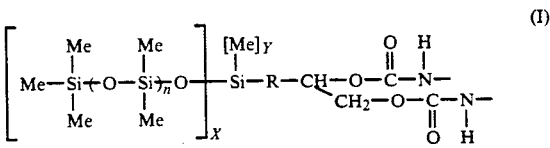

and a polyvinyl chloride; said process comprising the reaction of a one-diol-terminated polysiloxane represented by the general formula (II),

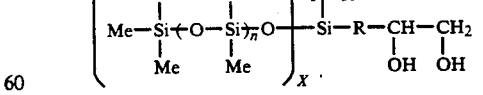

with a polyol and an isocyanate compound, in the presence of a polyvinyl chloride, where Me is a methyl group, n is an integer of 1≦n≦100, X and Y are respectively integers, provided that 1≦X≦3, 0≦Y≦2, and X+Y=3, and R is an alkylene group or alkylene groups which may be linked by one or more alkyleneoxy groups.

5. A process for producing a non-tacky composite resin composition comprising a polyurethane having a group represented by the general formula (I) in the molecule thereof:

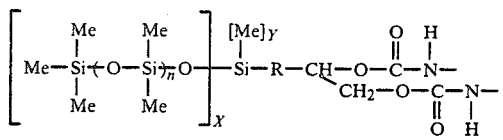

and a polyvinyl chloride; said process comprising reacting a one-diol-terminated polysiloxane represented by the general formula (II),

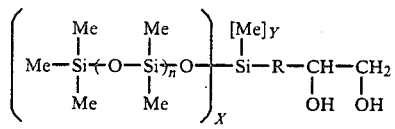

with a polyol and an isocyanate compound to prepare a polyurethane having a group represented by the general formula (I) in the molecule thereof; and subsequently blending the prepared polyurethane with a polyvinyl chloride, where Me is a methyl group, n is an integer of $1 \leq n \leq 100$, X and Y are respectively integers, provided that $1 \leq X \leq 3$, $0 \leq Y \leq 2$, and $X+Y=3$, and R is an alkylene group or alkylene groups which may be linked by one or more alkyleneoxy groups.

6. A process for producing a non-tacky composite resin composition comprising a polyurethane having a group represented by the general formula (I) in the molecule thereof:

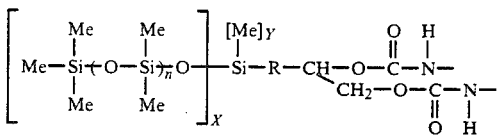

and a polyvinyl chloride; said process comprising first reacting a one-diol-terminated polysiloxane represented by the general formula (II),

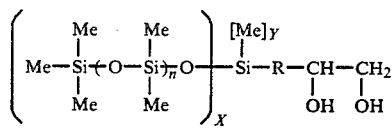

with an excess amount of an isocyanate compound to prepare a polyurethane having a group represented by the general formula (I) and a free isocyanate group in the molecule thereof, then reacting the resulting product with a polyol, and subsequently blending the prepared polyurethane with a polyvinyl chloride, where Me is a methyl group, n is an integer of $1 \leq n \leq 100$, X and Y are respectively integers, provided that $1 \leq X \leq 3$, $0 \leq Y \leq 2$, and $X+Y=3$, and R is an alkylene group or alkylene groups which may be linked by one or more alkyleneoxy groups.

7. A process for producing a non-tacky composite resin composition comprising a polyurethane having a group represented by the general formula (I) in the molecule thereof:

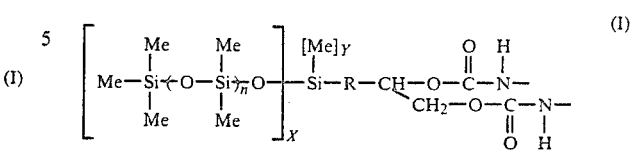

and a polyvinyl chloride; said process comprising first reacting a one-diol-terminated polysiloxane represented by the general formula (II),

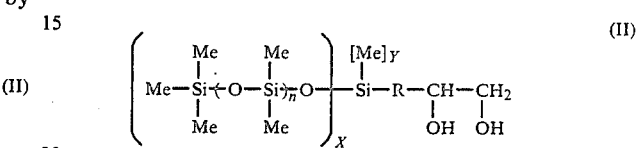

is reacted with an excess amount of an isocyanate compound to prepare a polyurethane having a group represented by the general formula (I) and a free isocyanate group in the molecule thereof, where Me is a methyl group, n is an integer of $1 \leq n \leq 100$, X and Y are respectively integers, provided that $1 \leq X \leq 3$, $0 \leq Y \leq 2$, and $X+Y=3$, and R is an alkylene group or alkylene groups which may be linked by one or more alkyleneoxy groups, and a second step in which the resulting product is reacted with a polyol;

the first step and/or the second step being carried out in the presence of polyvinyl chloride.

8. The process of claim 7 wherein the second step is carried out in the presence of polyvinyl chloride.

9. The resin composition of claim 3 wherein the one-diol-terminated polysiloxane has a molecular weight of from about 340 to 10,000.

10. The resin composition of claim 9 wherein the one-diol-terminated polysiloxane has a molecular weight of from about 500 to about 5,000.

11. The resin composition of claim 3 wherein the one-diol-terminated polysiloxane is used in an amount not more than about 5% by weight, based on the amount of the polyurethane component of the resin composition.

12. The resin composition of claim 11 wherein the one-diol-terminated polysiloxane is used in an amount from about 0.1% to about 3% by weight, based on the amount of the polyurethane component of the resin composition.

13. The resin composition of claim 3 wherein the polyol is a long-chain polyol or a short-chain polyol.

14. The resin composition of claim 13 wherein the long-chain polyol is selected from the group consisting of polyester polyols, polyether polyols, polycarbonate polyols, vinyl-type polyols, diene-type polyols, castor oil-type polyols, polyolefin-type polyols, and copolymers.

15. The resin composition of claim 13 wherein the long-chain polyol has a molecular weight of from about 300 to about 10,000.

16. The resin composition of claim 15 wherein the long-chain polyol has a molecular weight of from about 500 to about 8,000.

17. The resin composition of claim 16 wherein the long-chain polyol has a molecular weight of from about 1,500 to about 8,000.

18. The resin composition of claim 13 wherein the short-chain polyol is selected from the group consisting of aliphatic, alicyclic, aromatic, substituted aliphatic, and heterocyclic dihydroxy compounds, trihydroxy compounds and tetrahydroxy compounds.

19. The resin composition of claim 14 wherein the long-chain polyol is a polyester polyol derived by reacting a dicarboxylic acid with a diol containing no less than about 30 mol percent of 3-methyl-1,5-pentanediol, 2-methyl-1,8-octanediol, or mixtures thereof, and no more than about 70 mole percent of another short-chain diol.

20. The resin composition of claim 19 wherein the dicarboxylic acid is selected from the group consisting of adipic acid, pimelic acid, suberic acid, azelaic acid, sebacic acid.

21. The resin composition of claim 19 wherein the other short-chain diol is selected from the group consisting of aliphatic, alicyclic, substituted aliphatic diols.

22. The resin composition of claim 21 wherein the other short-chain diol is selected from the group consisting of ethylene glycol, 1,2-propanediol, 1,3-propanediol 1,3-butanediol, 1,4-butanediol, 1,5-pentanediol, 1,6-hexanediol, neopentyl glycol, 1,9-nonanediol, and 1,4-cyclohexane dimethanol.

23. The resin composition of claim 3 wherein the diisocyanate compound is selected from the group consisting of aromatic, aliphatic, and alicyclic diisocyanates, and mixtures thereof.

24. The resin composition of claim 23 wherein the diisocyanate compound is selected from the group consisting of diphenylmethane diisocyanate, toluene diisocyanate, hexamethylene diisocyanate, 4,4'-dicyclohexylmethane diisocyanate, and isophorone diisocyanate.

25. The resin composition of claim 3 wherein the diisocyanate compound is used in an amount such that the NCO/OH molar ratio, based on the total OH groups in the polyol and the one-diol-terminated polysiloxane combined, is from about 0.5 to about 3.

26. The resin composition of claim 25 wherein the diisocyanate compound is used in an amount such that the NCO/OH molar ratio, based on the total OH groups in the polyol and the one-diol-terminated polysiloxane combined, is from about 0.7 to about 1.5.

27. The resin composition of claim 26 wherein the diisocyanate compound is used in an amounted such that the NCO/OH molar ratio, based on the total OH groups in the polyol and the one-diol-terminated polysiloxane combined, is from about 0.7 to about 1.1.

28. The resin composition of claim 3 wherein the polyvinyl chloride is a polymer containing vinyl chloride units and having a polymerization degree of not lower than 600.

29. The resin composition of claim 28 wherein the polyvinyl chloride has a polymerization degree in the range of from about 700 to about 1,300.

30. The resin composition of claim 28 wherein the polyvinyl chloride is a homopolymer or is a copolymer selected from the group consisting of vinyl chloride/vinyl acetate copolymers, and vinyl chloride/ethylene/-vinyl acetate copolymers.

31. The resin composition of claim 3 wherein the polyvinyl chloride has been blended with an additive selected from the group consisting of stabilizers, lubricants, colorants.

32. The resin composition of claim 3 wherein the polyvinyl chloride is a polymer blend prepared by blending polyvinyl chloride with a thermoplastic resin or rubber compatible therewith.

33. The resin composition of claim 32 wherein the compatible thermoplastic resin or rubber is selected from the group consisting of acrylic resins, styrene resins, ABS resins, nitrile rubbers.

34. The resin composition of claim 3 wherein the weight ratio of the polyvinyl chloride component to the polyurethane component ranges from about 100/1000 to about 100/10.

35. The resin composition of claim 34 wherein the weight ratio of the polyvinyl chloride component to the polyurethane component ranges from about 100/200 to about 100/20.

36. The resin composition of claim 35 wherein the weight ratio of the polyvinyl chloride component to the polyurethane component ranges from about 100/150 to about 100/50.

37. The resin composition of claim 3, further containing a plasticizer.

38. The resin composition of claim 37 wherein the plasticizer is present in an amount of not more than about 20 parts by weight based on 100 parts by weight of the resin composition.

39. The resin composition of claim 37 wherein the plasticizer is selected from the group consisting of phthalic esters, trimellitic esters, dibasic acid esters, adipic polyesters, epoxy compounds, inorganic acid esters, glycol esters.

40. The resin composition of claim 39 wherein the plasticizer is dioctyl phthalate, trioctyl trimellitate, 2-ethylhexyl adipate, 2-ethylhexyl azelate, epoxidized soybean oil, epoxidized linseed oil, tricresyl phosphate, tributoxyethyl phosphate, or dibutyldiglycol adipate.

41. The resin composition of claim 3, further containing a dusting powder.

42. The resin composition of claim 41 wherein the dusting powder is a polyvinyl chloride powder having a particle diameter of from about 1 $\mu$m to about 10 $\mu$m.

43. The resin composition of claim 41 wherein the dusting powder is a polyvinyl chloride having a cross-linked structure or having a polymerization degree of not less than about 1,700.

44. The resin composition of claim 3 having a particle diameter in the range of from about 50 $\mu$m to about 500 $\mu$m.

45. A resin composition for powder sinter molding, containing a polyvinylchloride and a polyurethane, said polyurethane being produced by reacting
(A) a diisocyanate compound,
(B) a polyester-polyol derived by reacting a dicarboxylic acid with a diol containing no less than about 30 mol percent of 3-methyl-1,5-pentanediol, 2-methyl-1,8-octanediol, or mixtures thereof, and no more than about 70 mol percent of another short-chain diol, and
(C) a one-diol-terminated polysiloxane represented by the general formula (II):

$$\left[ \begin{array}{c} Me \\ | \\ Me-Si(-O-Si)_{\overline{n}}O \\ | \\ Me \end{array} \begin{array}{c} Me \\ | \\ \\ | \\ Me \end{array} \right]_x \begin{array}{c} [Me]_Y \\ | \\ -Si-R-CH-CH_2 \\ | \quad | \\ OH \quad OH \end{array} \quad (II)$$

where Me is a methyl group, n is an integer of $1 \leq n \leq 100$, X and Y are respectively integers, provided that $1 \leq X \leq 3$, $0 \leq Y \leq 2$, and $X+Y=3$, and R is an alkylene group or alkylene groups which may be linked by one or more alkyleneoxy groups.

46. The resin composition of claim 45 wherein the resin composition is in granular form.

47. The resin composition of claim 46, wherein the granules have a particle diameter of from about 50 to about 500 μ.

48. The resin composition of claim 45, further containing a plasticizer in an amount of not more than about 20 parts by weight per 100 parts by weight of the resin composition.

* * * * *

UNITED STATES PATENT AND TRADEMARK OFFICE
CERTIFICATE OF CORRECTION

PATENT NO. : 5,102,953
DATED : April 7, 1992
INVENTOR(S) : Noriyoshi Yano et al

It is certified that error appears in the above-indentified patent and that said Letters Patent is hereby corrected as shown below:

Column 2, line 9, change "&he" to --the--.

Column 2, line 53, change "(I)" to --(1)--.

Column 5, line 57, change "4-butanediol" to --1,4-butanediol--.

Column 7, line 14, change "(1)" to --(I)--.

Column 9, lines 23, change "COMPARATIVE REFERENCE EXAMPLE" TO --COMPARATIVE REFERENCE EXAMPLE 1--.

Column 10, line 20, change "Cm" to --cm--.

Column 13, claim 1, lines 64 and 65, delete "23 n" and add --≤ n--.

Column 17, claim 24, line 33, change "toluene" to --tolylene--.

Signed and Sealed this

Twenty-fourth Day of August, 1993

Attest:

BRUCE LEHMAN

Attesting Officer

Commissioner of Patents and Trademarks